(12) United States Patent
Kamiya

(10) Patent No.: US 8,529,272 B2
(45) Date of Patent: Sep. 10, 2013

(54) ROTARY CONNECTOR DEVICE

(75) Inventor: Kazutaka Kamiya, Shiga (JP)

(73) Assignee: Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 13/809,588

(22) PCT Filed: Sep. 27, 2011

(86) PCT No.: PCT/JP2011/005435
§ 371 (c)(1),
(2), (4) Date: Jan. 10, 2013

(87) PCT Pub. No.: WO2012/042855
PCT Pub. Date: Apr. 5, 2012

(65) Prior Publication Data
US 2013/0115785 A1    May 9, 2013

(30) Foreign Application Priority Data

Sep. 27, 2010 (JP) .................................. 2010-215401

(51) Int. Cl.
*H01R 39/00* (2006.01)
(52) U.S. Cl.
USPC ............................................... 439/15
(58) Field of Classification Search
USPC .................................. 439/15, 164
See application file for complete search history.

(56) References Cited

U.S. PATENT DOCUMENTS

| 7,452,224 | B1 * | 11/2008 | McDonald et al. | 439/164 |
| 8,083,525 | B2 * | 12/2011 | Fiala et al. | 439/15 |
| 8,382,500 | B2 * | 2/2013 | Adachi | 439/164 |
| 2004/0053517 | A1 * | 3/2004 | DuRocher et al. | 439/15 |
| 2009/0156034 | A1 * | 6/2009 | Araki et al. | 439/164 |
| 2012/0329314 | A1 * | 12/2012 | Adachi | 439/501 |

FOREIGN PATENT DOCUMENTS

| JP | 2001-126836 | 5/2001 |
| JP | 2006-502549 | 1/2006 |
| JP | 2006-120512 | 5/2006 |
| JP | 2009-143491 | 7/2009 |

OTHER PUBLICATIONS

International Search Report mailed Nov. 15, 2011 for PCT/JP2011/005435, 8 pages.

* cited by examiner

*Primary Examiner* — James Harvey
(74) *Attorney, Agent, or Firm* — Turocy & Watson, LLP

(57) ABSTRACT

A steering roll connector includes a rotator, a sleeve, and a fixed casing. The rotator includes a claw and an inner cylindrical part, and is mounted to a steering shaft such that the rotator is rotated integrally with the steering shaft inserted in the inner cylindrical part. The sleeve includes a projection connectable with the claw, and is mounted to the rotator such that the sleeve is rotated integrally with the rotator. The fixed casing includes an outer cylindrical part, and is mounted such that the fixed casing does not follow rotation of the steering shaft inserted in the outer cylindrical part and such that the fixed casing is in contact with the sleeve. A combination of materials of the claw and the projection is such that occurrence of a squeak caused when the claw and the projection are rubbed against each other is suppressed.

4 Claims, 5 Drawing Sheets

Fig.3

|  | FIRST MATERIAL | SECOND MATERIAL |
|---|---|---|
| ROTATOR (FIRST ROTATING MEMBER) | POM | PBT |
| SUB STATOR (SECOND FIXED MEMBER) | PBT | PBT |
| STATOR (FIRST FIXED MEMBER) | PBT | POM |
| SLEEVE (SECOND ROTATING MEMBER) | POM | PBT |

(a)

(b)

ROTARY CONNECTOR DEVICE

CROSS-REFERENCE TO RELATED APPLICATION

The subject application is a U.S. national stage application of PCT Application Ser. No. PCT/JP2011/005435, filed Sep. 27, 2011, and entitled "ROTARY CONNECTOR DEVICE", which claims priority to Japanese Patent Application Ser. No. 2010-215401, filed Sep. 27, 2010, the disclosures of which are incorporated herein by reference in their entirety.

TECHNICAL FIELD

The present invention relates to a rotary connector device. Particularly, the present invention relates to a configuration for reducing a noise occurring in a rotary connector device.

BACKGROUND ART

Conventionally, various types of rotary connectors are known for electrically connecting a rotating side and a fixed side, such as a steering side and a vehicle body side of a vehicle, to each other. Patent Document 1 discloses this type of rotary connector.

A rotary connector device of the Patent Document 1 includes a first casing configured to be rotated integrally with a steering, and a second casing configured not to follow rotation of the steering. In these casings, a steering shaft (insert) can be inserted. These casings have an annular space formed therein. In the annular space, a flexible flat cable that electrically connects a steering side member and a vehicle body side member to each other is arranged. Hereinafter, configurations of the first casing and the second casing will be described with reference to FIG. 5.

The first casing includes a rotator and a sleeve. The rotator is fixed to the steering shaft such that the rotator is rotatable integrally with the steering. The sleeve is fixed to the rotator by snap-fitting. In this configuration, when the steering shaft rotates, a force is transmitted from the steering shaft so that the rotator is rotated and accordingly the sleeve is also rotated.

The second casing includes a stator and a sub stator. The stator is fixed to a steering column such that the stator does not follow rotation of the steering. The sub stator is fixed to the stator by snap-fitting. In this configuration, even when the steering shaft rotates, the stator and the sub stator are not rotated.

In this configuration, the sleeve is in contact with the stator, and the rotator is in contact with the sub stator.

PRIOR-ART DOCUMENTS

Patent Documents

Patent Document 1: Japanese Patent Application Laid-Open No. 2001-126836

SUMMARY OF THE INVENTION

Problems to be Solved by the Invention

In the above-described conventional rotary connector device, it has been considered that a high friction does not occur in a contact portion between the sleeve and the stator and in a contact portion between the rotator and the sub stator so that the rotation of one does not apply any large force to the other.

However, in the above-described rotary connector device, in a particular situation, an abnormal noise sometimes occurs when the steering is operated. The inventors of the present application, as a result of an intensive investigation of a cause thereof, have found that mainly two noises are caused from the rotary connector device (steering roll connector).

A first noise results from a portion where the rotator and the sleeve are connected to each other. To be specific, not only a force in a rotation direction of the steering shaft but also a force in an axial direction of the steering shaft (in a direction pushing the steering in or in a direction pulling the steering) and a force in a radial direction of the steering shaft (in a direction moving the steering in translation), may be applied to the steering shaft.

If, in a state where a force other than the force in the rotation direction is applied to the steering shaft and the sleeve is pressed against the stator, a force is transmitted to the rotator so that the sleeve is rotated, a relatively high friction occurs between the stator and the sleeve. Due to this friction, the sleeve receives a force traveling against the rotation. Thus, a large force is applied to a connection portion between the rotator and the sleeve.

As described above, if a force acts on the connection portion between the rotator and the sleeve, the positional relationship between a connection member (for example, a claw portion) at the rotator side and a connection member (for example, a receiving portion) at the sleeve side is slightly changed, and they are rubbed against each other. This causes a squeak that is the first noise. Particularly, the rotator and the sleeve are connected to each other by the snap-fitting which provides a weak fixing force, and therefore rubbing between members is likely to occur and the squeak tends to increase.

A second noise results from a portion where the stator and the sub stator are connected to each other, and is caused on the same principle as the first noise. To be specific, in the same manner as described above, the force in the axial direction and the force in the radial direction are applied to the steering shaft, and the rotator is strongly pressed against the sub stator. This causes a relatively high friction between the rotator and the sub stator when the rotator is rotated. Due to this friction, a connection portion between the sub stator and the stator receives a large force. Thus, a connection member (for example, a claw portion) at the sub stator side and a connection member (for example, a receiving portion) at the stator side are rubbed against each other, to cause a noise (squeak).

As mentioned above, it has been considered that a large force does not act between the sleeve and the stator and between the rotator and the sub stator. Therefore, a problem that the above-described two noises occur has not been assumed. Reduction of such noises is particularly demanded from the viewpoint of achieving the quietness in a vehicle, and the like.

The present invention is made in view of the circumstances described above, and an object of the present invention is to provide a rotary connector device in which a noise during rotation is reduced even in a situation where a force other than a force in a rotation direction acts on an insert (for example, a steering shaft).

Means for Solving the Problems and Effects Thereof

The problem to be solved by the present invention is as described above, and next, means for solving the problem and effects thereof will be described.

In an aspect of the present invention, a rotary connector device having the following configuration is provided. That is, the rotary connector device includes a first rotating member, a second rotating member, and a fixed member. The first rotating member includes a connecting portion and a cylindrical part, and is configured to be mounted such that the first rotating member is rotated integrally with an insert inserted in the cylindrical part. The second rotating member includes a connecting object portion connectable with the connecting portion, and is mounted to the first rotating member such that the second rotating member is rotated integrally with the first rotating member. The fixed member includes a second cylindrical part, and is mounted such that the fixed member does not follow rotation of the insert inserted in the second cylindrical part and such that the fixed member is in contact with the second rotating member. The first rotating member and the second rotating member are formed of the same material, and the material is able to suppress occurrence of a squeak caused when the material is rubbed against itself.

Accordingly, even when a force other than a force in a rotation direction is acting on the insert (for example, a steering shaft), a noise that occurs in the connecting portion and the connecting object portion during rotation of the first rotating member and the second rotating member can be reduced.

The rotary connector device is preferably configured as follows. That is, the fixed member includes a first fixed member. The first fixed member is configured to be mounted such that the first fixed member does not follow rotation of the insert, and is sandwiched between the first rotating member and the second rotating member and thereby pivotally supported. A material of the first fixed member is different from the material of the first rotating member and the second rotating member.

Accordingly, since memebers formed of different materials are in contact, a good abrasion resitance is obtained.

In the rotary connector device, it is preferable that the material of the first rotating member and the second rotating member is polybutylene terephthalate.

Accordingly, a squeak can be reduced as compared with a combination of polyacetal and polyacetal.

In the rotary connector device, it is preferable that the material of the first fixed member is polyacetal.

BRIEF DESCRIPTION OF THE DRAWINGS

[FIG. 3] A table showing materials used in this embodiment.

EMBODIMENT FOR CARRYING OUT THE INVENTION

Figure 1:
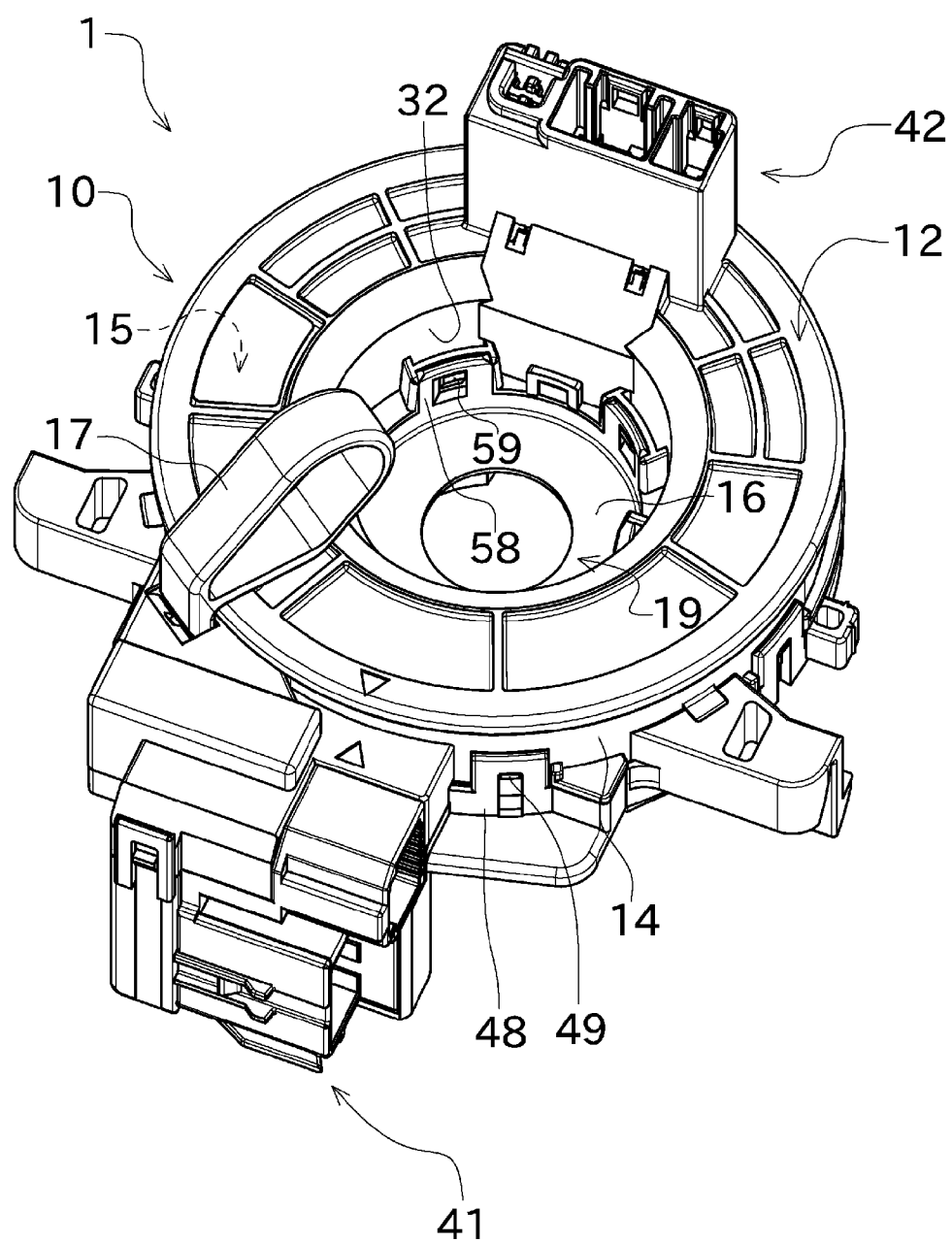
[FIG. 1] A perspective view showing an overall configuration of a steering roll connector according to one embodiment of the present invention.

Next, an embodiment of the invention will be described. FIG. 1 is a perspective view showing an overall configuration of a steering roll connector 1 according to one embodiment of the present invention, and FIG. 2 is an exploded perspective view of the steering roll connector 1.

Figure 2:
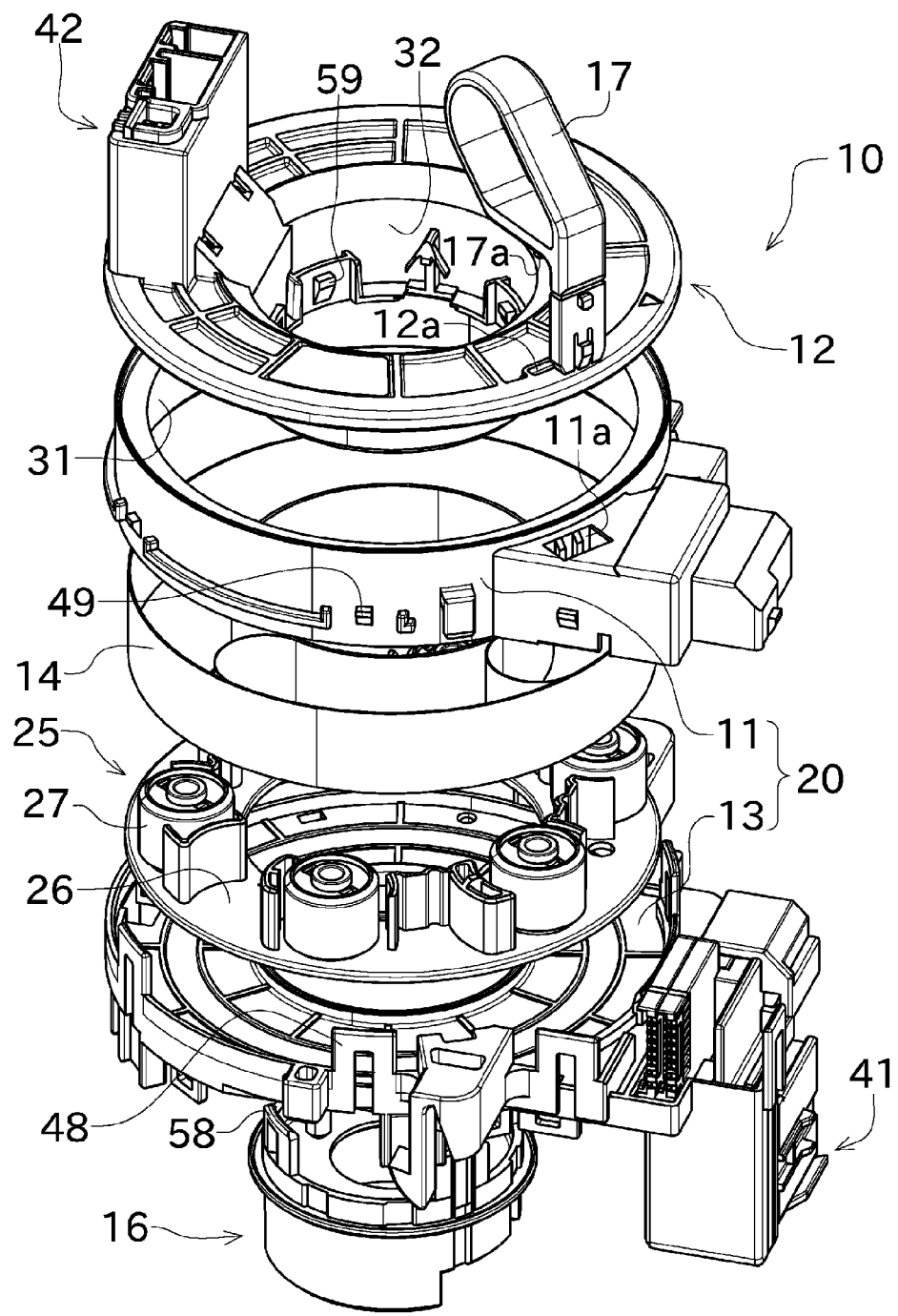
[FIG. 2] An exploded perspective view of the steering roll connector.

The steering roll connector 1 serving as a rotary connector device shown in FIGS. 1 and 2 includes a cable housing 10 having a rotator (first rotating member) 12 and a fixed casing (fixed member) 20. The fixed casing 20 is composed of a stator (first fixed member) 13 and a sub stator (second fixed member) 11.

The stator 13 is fixed to a combination bracket switch (not shown) of a steering column An insertion hole 19 in the shape of a through hole is formed at the center of the cable housing 10. A steering shaft supported on the steering column is inserted into the insertion hole 19. The stator 13 is rotatably mounted relative to the steering shaft.

As shown in FIG. 2 and the like, the stator 13 has a projection (second connecting portion) 48, and the sub stator 11 has a claw (second connecting object portion) 49 formed at a position corresponding to the projection 48. The projection 48 is hooked to the claw 49 (snap-fitting), and thereby the sub stator 11 is unrotatably mounted relative to the stator 13. Accordingly, not only the stator 13 but also the sub stator 11 is rotatable relative to the steering shaft.

On the other hand, the rotator 12 is fixed to the steering shaft such that it is rotated integrally with the steering shaft. A steering wheel (rotation operation instrument) is fixed to the steering shaft. A lower surface of the rotator 12 and an upper surface of the sub stator 11 are configured to be in contact with each other.

A sleeve (second rotating member) 16 is fixed to the rotator 12. The sleeve 16 has a projection (connecting object portion) 58, and the rotator 12 has a claw (connecting portion) 59 formed at a position corresponding to the projection 58. The projection 58 is hooked to the claw 59, and thereby the sleeve 16 is unrotatably mounted relative to the rotator 12 (snap-fitting). Since it is necessary to pivotally support the stator 13 by sandwiching it between the rotator 12 and the sleeve 16, the rotator 12 and the sleeve 16 are formed as separate parts and they are fixed to each other by snap-fitting. An upper surface of the sleeve 16 and a lower surface of the stator 13 are configured to be in contact with each other.

As shown in FIG. 2, an insertion slot 11a and an engagement recess 12a are formed in the sub stator 11 and the rotator 12, respectively. A fixing pin 17 for stopping rotation can be inserted through the insertion slot 11a. An engagement projection 17a is formed in the fixing pin 17. The fixing pin 17 is inserted through the insertion slot 11a and the engagement projection 17a is brought into engagement with the engagement recess 12a, and thereby the rotator 12 can be locked against rotation relative to the sub stator 11 and the stator 13.

The fixing pin 17 is temporarily attached at a time of manufacturing the steering roll connector 1, in order to prevent the position of the rotator 12 from being displaced from an intermediate position (a position intermediate between a position of the rotator 12 having been rotated in a clockwise direction to the maximum and a position of the rotator 12 having been rotated in a counterclockwise direction to the maximum) when the steering roll connector 1 is mounted to a vehicle body. This improves an efficiency of an operation for assembling the steering roll connector 1 to the vehicle body, and also prevents an error in the assembling. After the steering roll connector 1 is appropriately mounted to the vehicle body, the fixing pin 17 is broken off at the root of a portion inserted through the insertion slot 11a. Thereby, the rotator 12 is made rotatable relative to the sub stator 11 and the stator 13.

A first connector 41 is mounted to the stator 13, and a second connector 42 is mounted to the rotator 12. The second connector 42 is rotated integrally with the rotation of the rotator 12. The first connector 41 is configured for connection with a wiring harness included in an electrical circuit at the vehicle body side. The second connector 42 is configured for connection with cables, not shown, extending from electrical component (such as a horn switch and an airbag module)

included in the steering wheel. The first connector 41 and the second connector 42 are electrically connected to each other by a flexible flat cable 14 which will be described later.

The stator 13 and the rotator 12 are opposed to each other in a direction of a rotation axis of the steering shaft. The rotator 12 and the stator 13 are arranged such that they connect an outer cylindrical part 31 provided at the inner side of the sub stator 11 and an inner cylindrical part 32 provided at the inner side of the rotator 12 to each other. The inner cylindrical part 32 is arranged inner than the outer cylindrical part 31. The outer cylindrical part 31 and the inner cylindrical part 32 are arranged opposed to each other in a radial direction. In the above-described configuration, an accommodation space 15 that is an annular space surrounded by the stator 13, the rotator 12, the outer cylindrical part 31, and the inner cylindrical part 32, is formed.

As shown in FIG. 2, a retainer 25 and the flexible flat cable 14 are accommodated within the accommodation space 15. The retainer 25 includes a base ring 26 and a plurality of rotating rollers 27.

The base ring 26 is configured as a plate-like member having an annular shape, and arranged adjacent to the stator 13. The base ring 26 is rotatable around an rotation axis of the rotator 12. The rotating rollers 27 are arranged on one surface side of the base ring 26 at regular intervals in a circumferential direction. Each of the rotating rollers 27 is rotatable around an axis that is parallel to the rotation axis of the rotator 12. The flexible flat cable 14 is accommodated in the accommodation space 15 in such a manner that it is wound on the base ring 26.

To be specific, the flexible flat cable 14 is drawn out from the first connector 41 into the accommodation space 15, and a part of it is wound at the outer side of the retainer 25 and along an inner circumferential surface of the sub stator 11. Then, in the middle of the winding, the flexible flat cable 14 reverses its direction while wrapping around one of the plurality of rotating rollers 27. Thereafter, the flexible flat cable 14 is wound at the inner side of the retainer 25 and along an outer circumferential surface of the inner cylindrical part 32 of the rotator 12, and finally is drawn out from the accommodation space 15 and introduced into the second connector 42.

In this manner, within the accommodation space 15, the flexible flat cable 14 is wound with an appropriate length of loosening. This length of loosening changes as the rotator 12 rotates relative to the stator 13. The retainer 25 appropriately rotates so as to follow the change in the loosening length, and thereby enables the flexible flat cable 14 to be always held in an aligned state within the accommodation space 15.

Next, with reference to FIG. 3, a description will be given to a selection of materials made in this embodiment in order to reduce a noise that occurs during the rotation when a force other than a force in a rotation direction acts on the steering shaft. FIG. 3 is a table showing materials used in this embodiment.

Generally, it is known that a squeak occurring when resins are rubbed against each other is smaller in a case of rubbing between members of different materials than in a case of rubbing between members of the same material. One of the reasons therefor is that the phenomenon of a so-called chafing occurs at a contact surface between members in a case of the same material, while this chafing phenomenon is reduced in a case of different materials. It is also known that, even in a case where members of the same material are rubbed against each other, the magnitude of the squeak varies depending on the material.

Considering the conditions described above, the inventors discussed PBT (polybutylene terephthalate) and POM (polyacetal) as the materials of the rotator 12, the sub stator 11, the stator 13, and the sleeve 16 included in the steering roll connector 1 of this embodiment.

In the following, a specific description will be given. The inventors of the present application firstly discussed a combination of POM and POM and a combination of PBT and PBT, as the materials of the rotator 12 (claw 59) and the sleeve 16 (projection 58) ("FIRST MATERIAL" and "SECOND MATERIAL" of FIG. 3). As a result, it has been found that the squeak is reduced in the combination of PBT and PBT as compared with the combination of POM and POM.

The inventors of the present application also discussed a combination of PBT and PBT and a combination of a PBT and a POM, as a combination of materials of the sub stator 11 (claw 49) and the stator 13 (projection 48) ("FIRST MATERIAL" and "SECOND MATERIAL" of FIG. 3). As a result, it has been found that the squeak is reduced in the combination of PBT and POM as compared with the combination of PBT and PBT.

FIG. 4(a) is a graph showing an outline of a sound pressure level of a squeak occurring in the claw 59 and the projection 58 in a case where both the rotator 12 and the sleeve 16 are formed of POM. FIG. 4(b) is a graph showing an outline of a sound pressure level of a squeak occurring in the claw 59 and the projection 58 in a case where both the rotator 12 and the sleeve 16 are formed of PBT.

Figure 4:
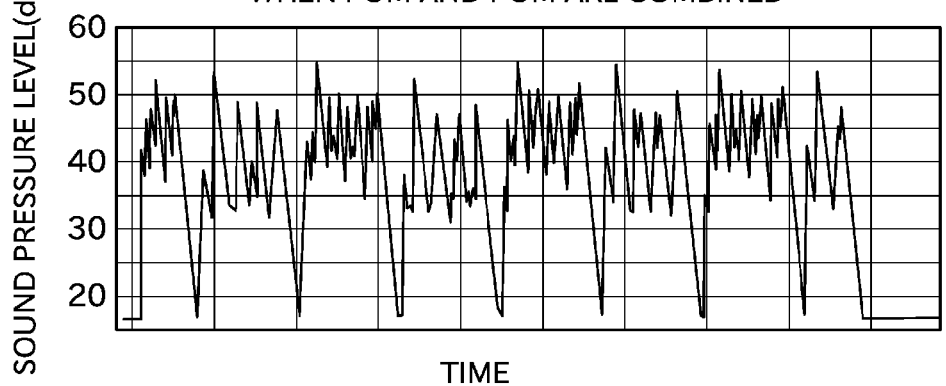
[FIG. 4] Graphs showing that a noise has been reduced as a result of changing the materials.
Figure 4:
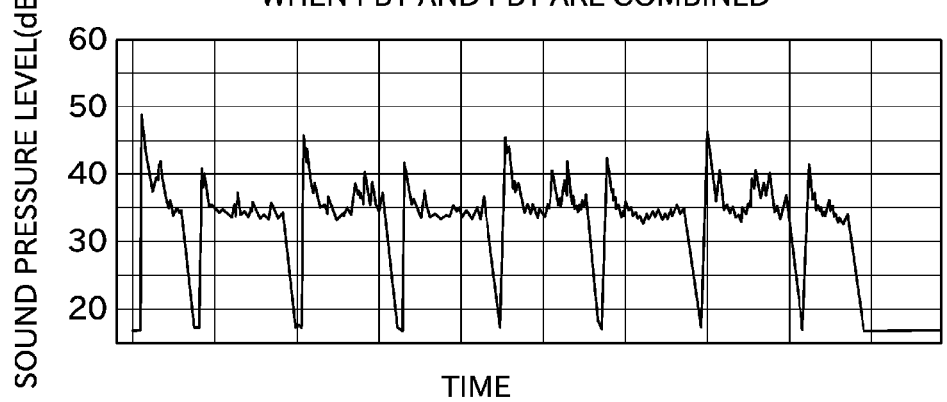
Figure 5:
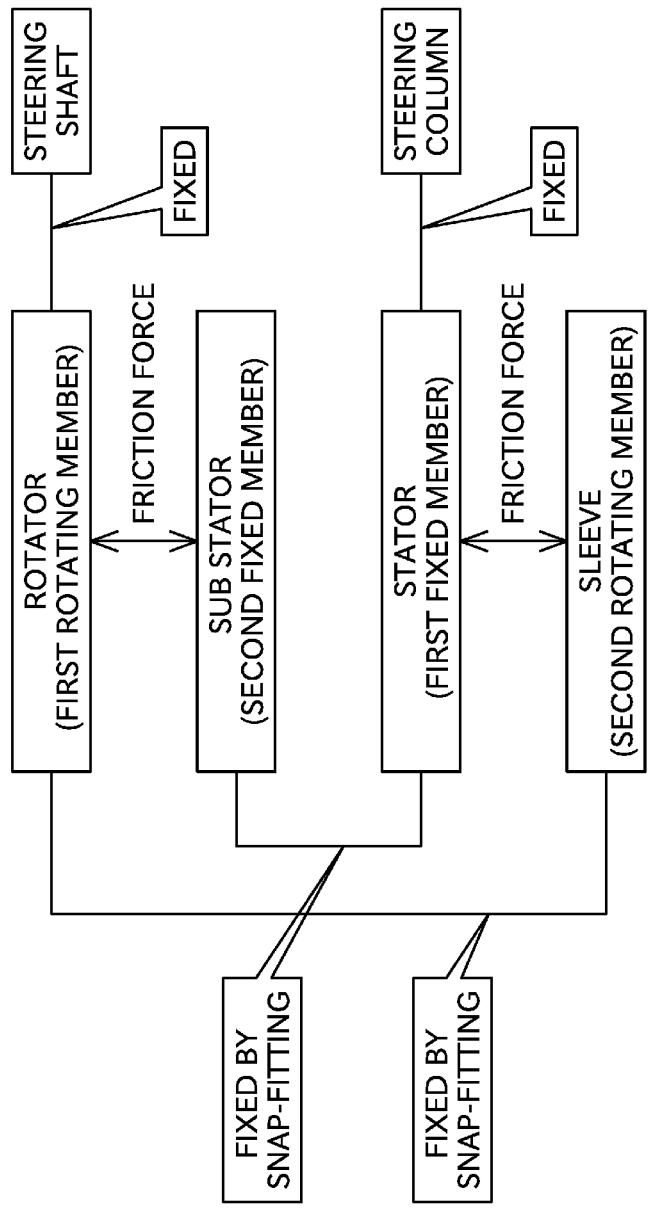
[FIG. 5] A diagram for explaining the relationship among members included in the steering roll connector.

As seen from FIG. 4, the sound pressure level of the squeak is lower in a case where both the rotator 12 and the sleeve 16 are formed of PBT than in a case where both the rotator 12 and the sleeve 16 are formed of POM.

By selecting the materials of the resins in the above-described manner, the steering roll connector 1 capable of suppressing occurrence of an abnormal noise even if a rotational force that pries the steering shaft is applied is provided.

From the viewpoint of noise reduction only, it is also conceivable that the rotator 12 is formed of POM, the sub stator 11 is formed of PBT, the stator 13 is formed of POM, and the sleeve 16 is formed of PBT. However, it is known that the abrasion resistance deteriorates in a case where sliding portions of the stator 13 and the rotator 12 or of the stator 13 and the sleeve 16 are formed of the same material, and the above-mentioned configuration applies to this case. Accordingly, the combination shown in SECOND MATERIAL of FIG. 3 is more excellent than the above-mentioned configuration.

The steering roll connector 1 also includes a rotation sensor for detecting rotation, though not shown. Since the rotation sensor is arranged at a position in contact with the sleeve 16, it is preferable that the rotation sensor and the sleeve 16 are formed of different materials. For example, when the material of the rotation sensor is POM, PBT is adopted as the material of the sleeve 16, and thereby a noise can be reduced.

As described above, the steering roll connector 1 of this embodiment includes the rotator 12, the sleeve 16, and the fixed casing 20. The rotator 12 includes the claw 59 and the inner cylindrical part 32, and is mounted to the steering shaft such that the rotator 12 is rotated integrally with the steering shaft inserted in the inner cylindrical part 32. The sleeve 16 includes the projection 58 connectable with the claw 59, and is mounted to the rotator 12 such that the sleeve 16 is rotated integrally with the rotator 12. The fixed casing 20 includes the outer cylindrical part 31, and is mounted to the steering column such that the fixed casing 20 does not follow the rotation of the steering shaft inserted in the outer cylindrical part 31 and such that the fixed casing 20 is in contact with the sleeve 16. A combination of materials of the claw 59 and the projection 58 is such that a squeak occurring when the claw 59 and the projection 58 are rubbed against each other is suppressed.

Accordingly, when a force other than the force in the rotation direction acts on the steering shaft, the noise that occurs in the claw 59 and the projection 58 during the rotation of the rotator 12 and the sleeve 16 can be reduced.

In the steering roll connector 1 of this embodiment, the claw 59 and the projection 58 are fixed to each other by fitting of the claw 59 into the projection 58.

This can achieve a configuration with an excellent operability in mounting while suppressing occurrence of a squeak during the rotation of the rotator 12 and the sleeve 16.

In the steering roll connector 1 of this embodiment, the fixed casing 20 includes the stator 13 and the sub stator 11. The stator 13 includes the projection 48, and is fixed to the steering column such that the stator 13 does not follow the rotation of the steering shaft. The sub stator 11 includes the claw 49 connectable with the projection 48, and is mounted to the stator 13 such that the sub stator 11 is not rotated relative to the stator 13 and is arranged such that the sub stator 11 is in contact with the rotator 12. A combination of materials of the claw 49 and the projection 48 is such that a squeak occurring when the claw 49 and the projection 48 are rubbed against each other is suppressed.

Accordingly, even when a force other than the force in the rotation direction is acting on the steering shaft, the noise that occurs in the claw 49 and the projection 48 during the rotation of the rotator 12 and the sleeve 16 can be reduced.

In the steering roll connector 1 of this embodiment, the claw 49 and the projection 48 are fixed to each other by fitting of one of them into the other.

This can achieve a configuration with an excellent operability in mounting while suppressing occurrence of a squeak during the rotation of the rotator 12 and the sleeve 16.

In the steering roll connector 1 of this embodiment, for the rotator 12 and the sleeve 16, PBT and PBT are used as such a combination of materials that occurrence of a squeak is suppressed.

This, as compared with the combination of POM and POM, can reduce the noise that occurs during the rotation of the rotator 12 and the sleeve 16 in a situation where a force other than the force in the rotation direction acts on the steering shaft.

In the steering roll connector 1 of this embodiment, for the sub stator 11 and the stator 13, a combination of PBT and POM is used as such a combination of materials that occurrence of a squeak is suppressed.

This, as compared with the combination of PBT and PBT, can reduce the noise that occurs during the rotation of the rotator 12 and the sleeve 16 in a situation where a force other than the force in the rotation direction acts on the steering shaft.

Although a preferred embodiment of the present invention has been described above, the above-described configuration may be modified, for example, as follows.

The combination of the materials of the rotator 12 and the sleeve 16 is not limited to the above-described one, as long as occurrence of a squeak occurring when the rotator 12 and the sleeve 16 are rubbed against each other can be suppressed. For example, in a possible configuration, a combination of PBT and POM may be adopted, or another engineering plastic may be adopted. The same applies to the combination of the materials of the sub stator 11 and the stator 13.

The configuration for fixing the rotator 12 and the sleeve 16 to each other is not limited to the above-described configuration. For example, a method may be adopted in which pin holes formed in the rotator 12 and the sleeve 16, respectively, are aligned and a joint pin is pushed into them. The same applies to the configuration for fixing the sub stator 11 and the stator 13 to each other.

Description of Reference Numerals 1 steering roll connector (rotary connector device)
11 sub stator (second fixed member)
12 rotator (first rotating member)
13 stator (first fixed member)
16 sleeve (second rotating member)
20 fixed casing (fixed member)
31 outer cylindrical part (second cylindrical part)
32 inner cylindrical part (cylindrical part)
48 projection (second connecting portion)
49 claw (second connecting object portion)
58 projection (connecting object portion)
59 claw (connecting portion)

The invention claimed is:

1. A rotary connector device comprising:
a first rotating member including a connecting portion and a cylindrical part, the first rotating member being configured to be mounted such that the first rotating member is rotated integrally with an insert inserted in the cylindrical part;
a second rotating member including a connecting object portion connectable with the connecting portion, the second rotating member being mounted to the first rotating member such that the second rotating member is rotated integrally with the first rotating member; and
a fixed member including a second cylindrical part, the fixed member being mounted such that the fixed member does not follow rotation of the insert inserted in the second cylindrical part and such that the fixed member is in contact with the second rotating member,
wherein the first rotating member and the second rotating member are formed of the same material, and the material is able to suppress occurrence of a squeak caused when the material is rubbed against itself.

2. The rotary connector device according to claim 1, wherein
the fixed member includes a first fixed member configured to be mounted such that the first fixed member does not follow rotation of the insert, the first fixed member being sandwiched between the first rotating member and the second rotating member and thereby pivotally supported,
a material of the first fixed member is different from the material of the first rotating member and the second rotating member.

3. The rotary connector device according to claim 1, wherein
the material of the first rotating member and the second rotating member is polybutylene terephthalate.

4. The rotary connector device according to claim 2, wherein
the material of the first fixed member is polyacetal.

* * * * *